United States Patent
Ha

[11] Patent Number: 5,947,208
[45] Date of Patent: Sep. 7, 1999

[54] FIRE EXTINGUISHER CABINET WITH EMERGENCY LIGHTING

[76] Inventor: Toan Huy Ha, 3408 Dougall Ave., Windsor, Ontario, Canada, N9E 1T1

[21] Appl. No.: 08/937,839

[22] Filed: Sep. 28, 1997

[51] Int. Cl.⁶ ................................................ A62C 25/00
[52] U.S. Cl. .................... 169/51; 312/242; 312/138.1
[58] Field of Search ............................. 169/51; 312/242, 312/245, 326, 329, 223.5, 109, 138.1; 362/20, 21, 133, 183, 276; 220/337, 339; 49/504

[56] References Cited

U.S. PATENT DOCUMENTS

| | | | |
|---|---|---|---|
| 3,067,822 | 12/1962 | Hattenhauer | 312/242 |
| 4,548,274 | 10/1985 | Simpson | 169/51 |
| 5,574,423 | 11/1996 | Vosika et al. | 362/20 |
| 5,800,027 | 9/1998 | Dunn | 312/138.1 |

FOREIGN PATENT DOCUMENTS 6-165838  6/1994  Japan ........................................ 169/51

Primary Examiner—Andres Kashnikow
Assistant Examiner—Dinh Q. Nguyen
Attorney, Agent, or Firm—John R. Benefiel

[57] ABSTRACT

A fire extinguisher cabinet especially adapted for a residential-office installation which includes emergency lighting automatically energized when house power is interrupted, powered by a rechargeable battery in a battery storage-wiring junction box hung below the cabinet. A selectively turned on night light is also included. The cabinet includes a main housing piece molded integrally with a hinged door having a lightly colored panel allowing viewing of the fire extinguisher within. A mounting frame abutted against the inside of the wall panel is secured to an outside flange on the main housing piece. A sheet metal shielding housing is secured covering the inside of the main housing piece, attached to the mounting frame.

23 Claims, 8 Drawing Sheets

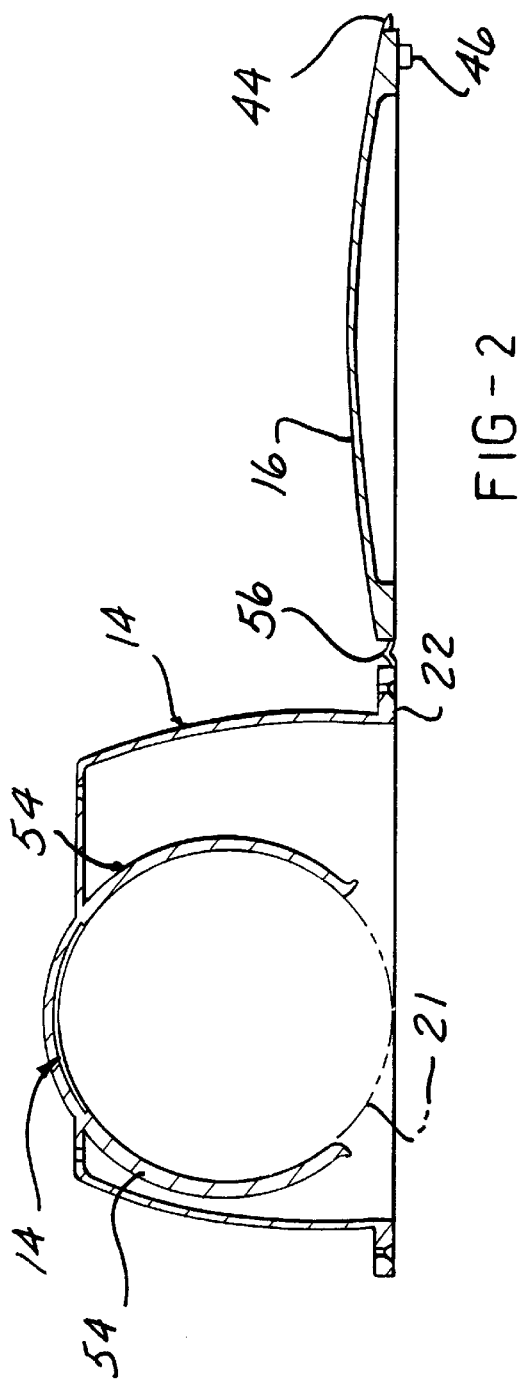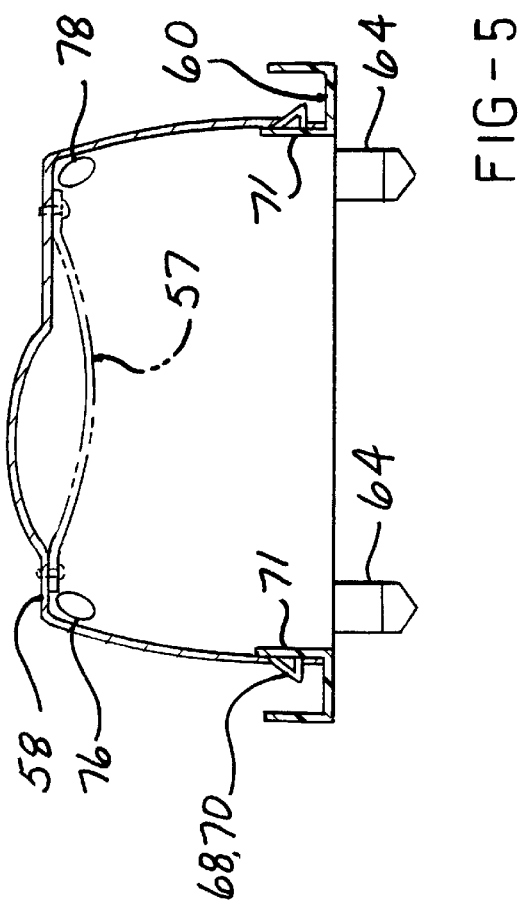

FIRE EXTINGUISHER CABINET WITH EMERGENCY LIGHTING

BACKGROUND OF THE INVENTION

This invention concerns wall cabinets for enclosing fire extinguishers.

The ready availability of a fire extinguisher can be of a great benefit to prevent catastrophic fires since relatively small fires can quickly be extinguished with the proper type of fire extinguisher preventing a conflagration.

Fire extinguishers mounted ready for use are required for many businesses but have been slow to be installed in residences despite the obvious safety benefits. One reason that fire extinguishers have not been mounted for ready use in living spaces of residences on a more widespread basis has been the lack of a storage facility for the fire extinguisher which is aesthetically compatible with home interior decor while at the same time being readily accessible in an emergency.

Often when a fire occurs, there has been a power failure and under night time conditions, emergency lighting would be highly desirable to locate and extract the fire extinguisher from its storage site. Emergency lighting heretofore provided has been excessively utilitarian in appearance and expensive.

Emergency lighting should preferably be automatically energized when a power failure occurs and such automatic energization should be reliably activated even after a period of years during which no power failure has occurred.

Non-emergency occurs night lighting for the fire extinguisher storage site is also a very desirable feature.

Relatively utilitarian cabinet structures have heretofore been provided suited to institutional or industrial settings, but heretofore a cabinet compatible with residential or office settings has not been provided which meets the requirements described.

Accordingly, it is an object of the present invention to provide a fire extinguisher cabinet which is aesthetically adapted to home interior decor and easily installed recessed into residential light frame wall structures, while at the same time being readily accessible in emergency situations by virtue of automatically activated emergency lighting.

SUMMARY OF THE INVENTION

The fire extinguisher cabinet according to the present invention is adapted to be recessed into the wall of a residence or office received between the studs of a framed interior wall. The visible portions of the cabinet have aesthetically pleasing arched lines.

The cabinet is combined with an emergency lighting section at the top which provides an automatically activated emergency lighting powered by a rechargeable battery mounted beneath the cabinet structure and within the wall space into which the cabinet is recessed. A manual switch operated night light may also be is included in the lighting section.

The cabinet includes a main housing piece comprised of an open front main housing piece of molded plastic defining a box-shaped enclosure for receiving a fire extinguisher. A hinged door is integrally molded with the main housing piece with a light-colored clear acrylic window allowing veiled visibility of the fire extinguisher through the closed door.

A metal mounting frame with a channel cross section is secured surrounding the inside of a wall opening receiving the cabinet and fastened to a flange on the outside perimeter of the main panel housing piece abutting the outside of the wall panel, fasteners penetrating the wall panel to fasten the frame to the flange. A sheet metal fire shield hood is secured enclosing the rear of the main housing piece.

The mounting frame may also be used as an anchored cutting or marking template during installation for cutting a suitable opening into the drywall or other wall panel, pointed tabs penetrating the wall when the reversed frame is pushed against the wall panel at the installation site, holding the frame in position during marking and/or cutting of the wall panel opening. The tabs can be bent to hold the frame in position inside the wall while installation of the other parts proceeds.

A sheet metal box is provided for the storage of a battery and also functioning as a junction box for enclosing connections with the house wiring.

A circuit board is mounted at the top of the main housing piece over the fire extinguisher receiving cavity and below the emergency light section and contains components for automatically activating the battery-powered emergency lighting and for activating charging of the rechargeable battery as long as the house power is provided uninterruptedly.

The circuit also activates LED indicator lights for providing a self-diagnostic indication of the emergency lamp failure and also improper function of the battery charging circuit.

The cabinet is especially suited to installation in residential light frame construction, as used in dwellings or offices and is aesthetically compatible with the decor of such settings.

DESCRIPTION OF THE DRAWINGS

FIG. 2 is a sectional view taken across the main housing piece included in the cabinet according to the present invention.

FIG. 5 is a transverse sectional view taken through the shielding hood and frame components of FIG. 4.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
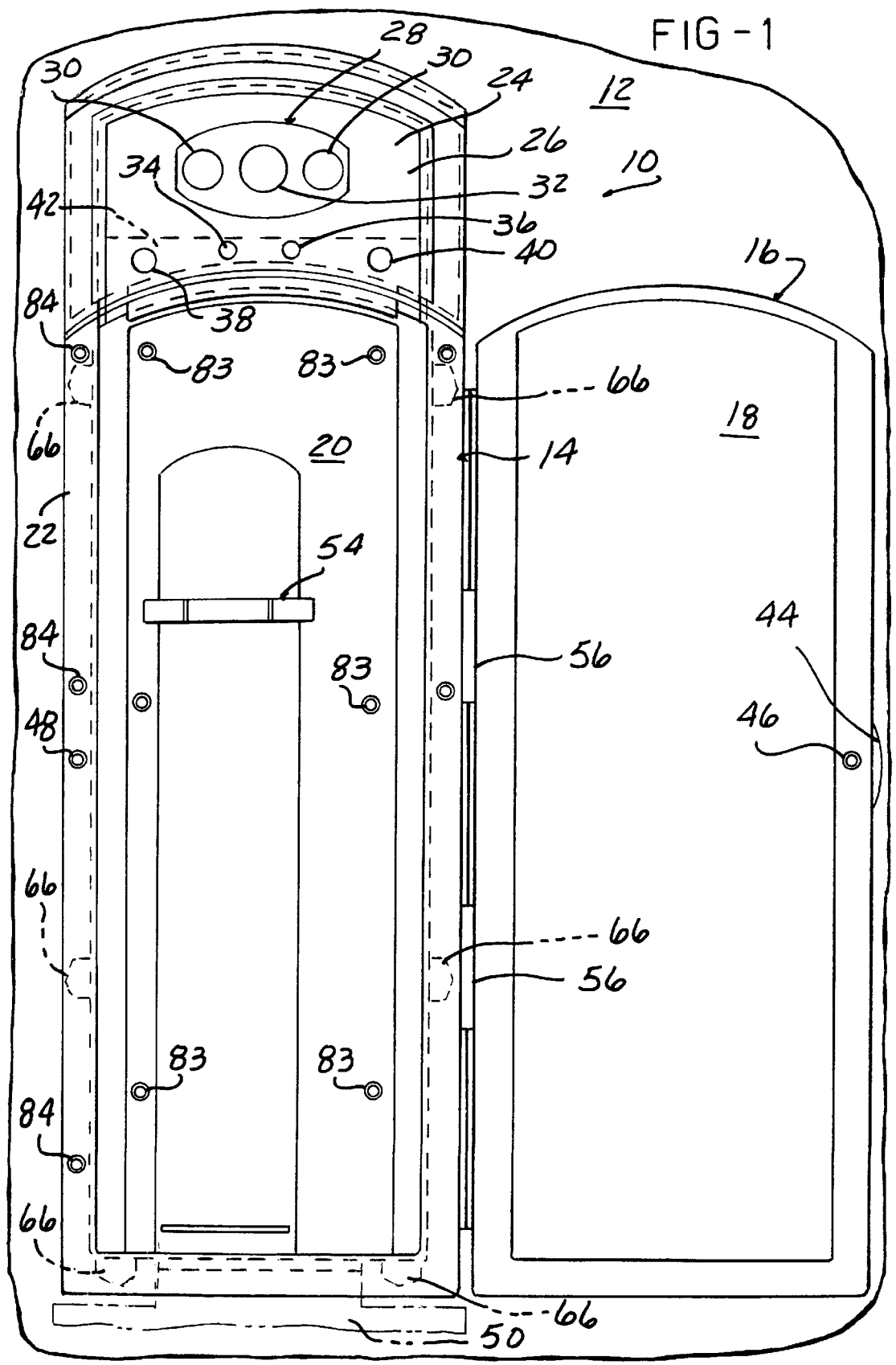
FIG. 1 is a front elevational view of an installed fire extinguisher cabinet according to the present invention.

Referring to the drawings and particularly FIG. 1, the fire extinguisher cabinet 10 according to the invention is depicted, installed recessed into an interior wall 12 contemplated as of light frame construction with drywall panels, or other type of decorative finish wall panel installed over 2×4 (or deeper) framing.

The cabinet 10 includes a main housing piece 14 recessed into the wall 12 and having a door 16, shown opened in FIG. 1 having a transparent, light-colored acrylic panel 18, the door adapted to be snap closed over a storage enclosure 20 for receiving a standard fire extinguisher (not shown). An integrally molded mounting clip 54 is provided for securing the fire extinguisher. The main housing piece 14 includes a perimeter flange 22 which extends around the enclosure cavity 20 and upwardly thereof around a reflector piece 24 mounted above the main enclosure cavity 20 and likewise recessed into the wall panel 12.

The main housing piece 14, including the door 16 and flange 22, is preferably of molded plastic of a variety of colors suited to various interior decorating color schemes.

The exposed top portions of the main housing piece 14 and reflector housing piece 24 are arched to provide a graceful appearance.

A panel 26 having a translucent section 26A is attached with screws 27, made removable in order to change light bulbs and overlies the open interior of the reflector piece 24.

A series of light bulbs or lamps are received in respective sockets 28 integral with the endwall of the reflector piece 24 for receiving two 12 volt emergency light bulbs 30 and a 115 volt night light bulb 32 in between.

Also visible through the panel 26 are yellow and red LED self-diagnostic indicators 34, 36. Switch buttons 38, 40, as will be described further herein, are also mounted into a flange section 42 of the reflector piece 24.

The door 16 has an integrally molded finger grip feature 44 and a lock 46 received into an opening 48 in the flange 22 of the main enclosure piece 14.

Emergency power for operation of the emergency lights 30 is provided by a battery 50 disposed in a metal battery storage-junction box 88 which is mounted in the space behind the wall panel 12, hung below the main housing piece 14 with a suitable wire connection to a circuit board 52 mounted beneath the reflector piece 26.

A fire extinguisher is shown in phantom in FIG. 2 at 21 received in clip 54.

The door 16 also may be hinged by means of integral hinge sections 56 molded to extend from the flange 22. The main housing piece 20 comprises a generally box-like volume of a depth such as to be accommodated within the available wall space, i.e., the 3½ inches of a 2×4 framed interior wall.

Figure 3:
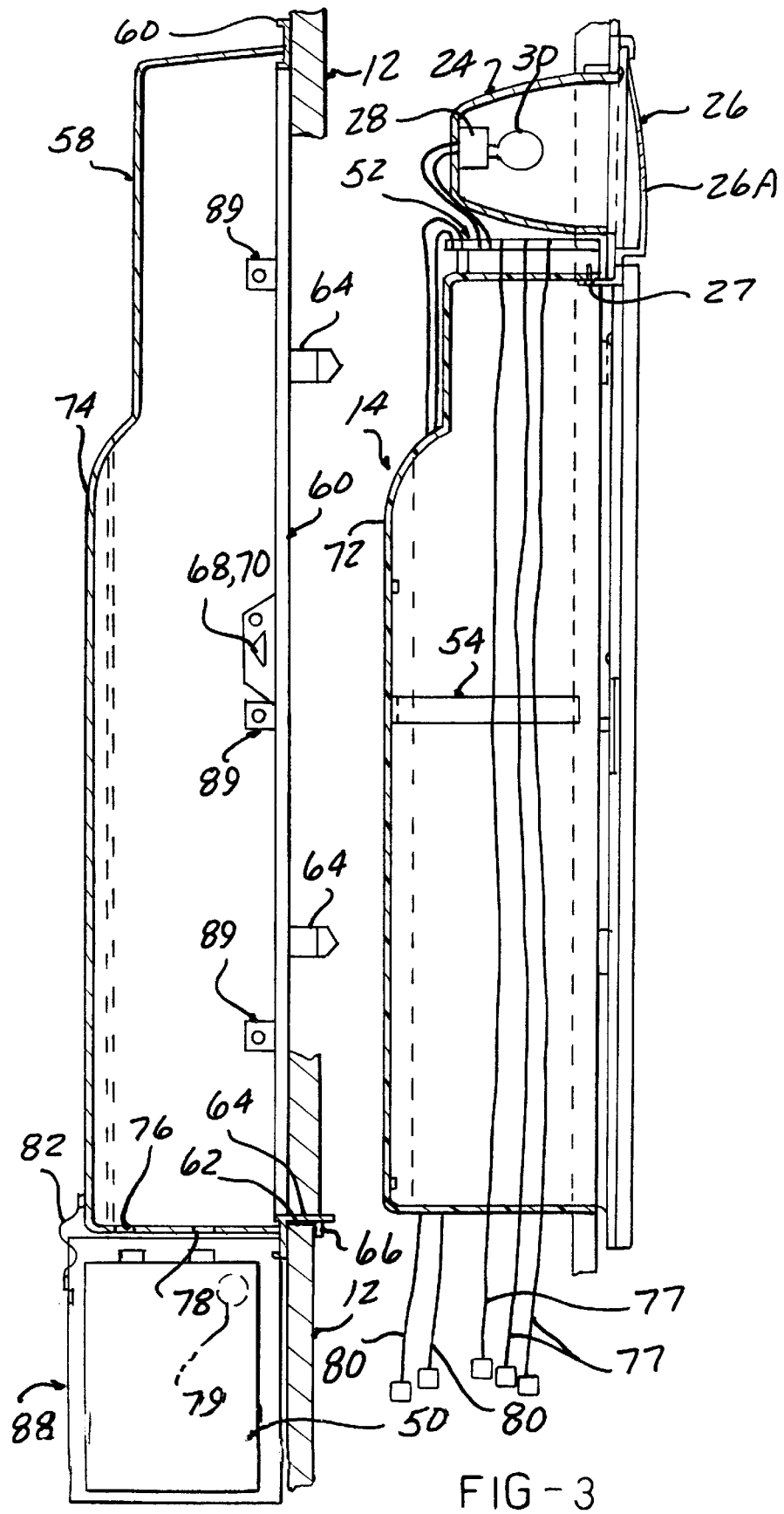
FIG. 3 is an exploded view of the cabinet and adjacent wall portions with the components in partial section.
Figure 4:
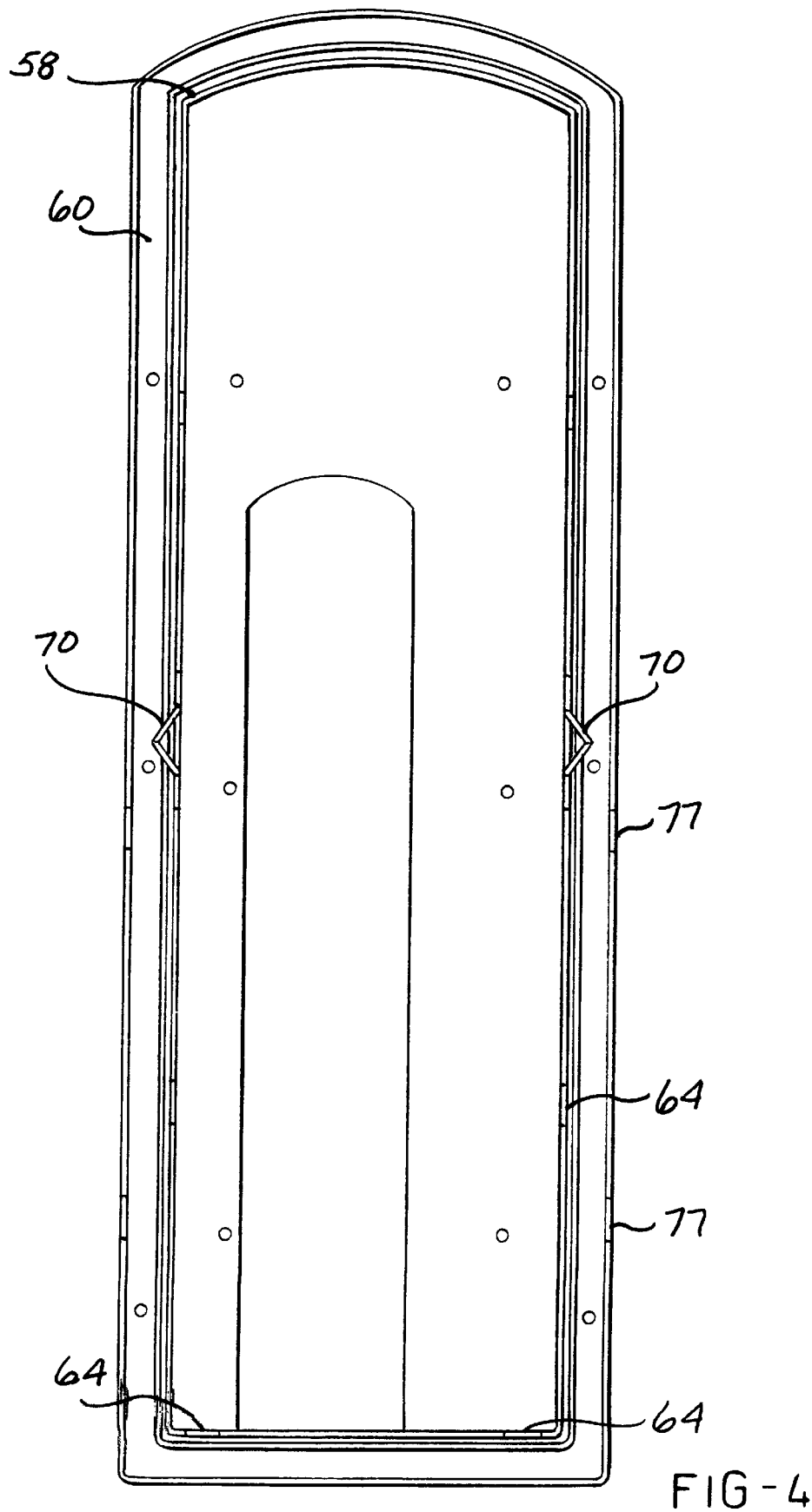
FIG. 4 is a front elevational view of the shielding hood and mounting frame components of the cabinet.
Figure 6:
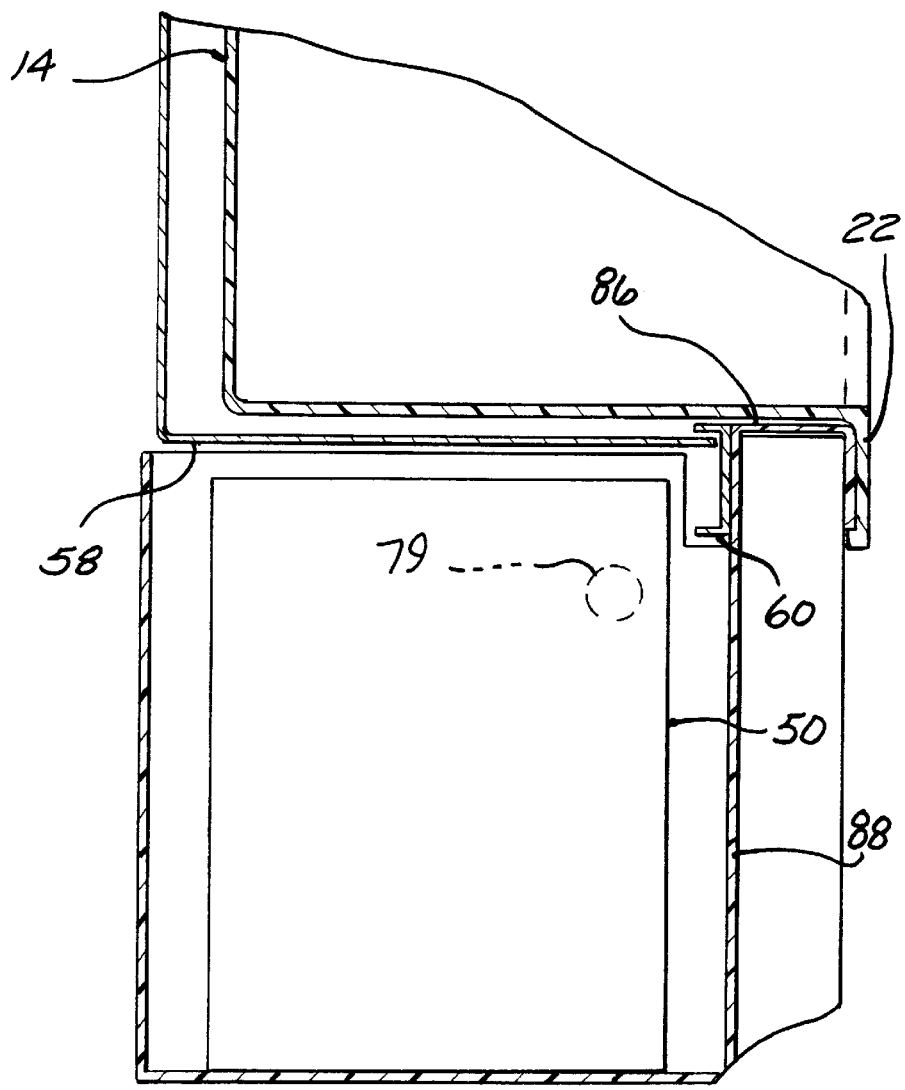
FIG. 6 is an enlarged fragmentary sectional view taken through the lower portion of the cabinet illustrating the support of the battery storage-junction box.

As seen in FIG. 3 the main housing piece 14 is positioned and nested into a sheet metal shielding hood 58 secured to a frame member 60. Frame member 60 may also be used as an anchored template in cutting the opening in the wall by being reversed and the pointed tabs 64 punched into the wall panel 12 to be held while the opening outline is scribed or the opening cut into the wall panel 12.

The metal shielding hood 58 is first inserted into the wall panel opening to one side of the battery storage box 88 and hung below by a wire hook to be out of the way, enabling the frame 60 to be inserted. The open frame member 60, after installation and insertion in an opening 62 in the drywall or other wall panel 12, is secured temporarily by bending over the ends 66 of the pointed tabs 64 which project past the perimeter of the wall opening 62, the ends 66 when bent over as seen in FIG. 3 lightly clamping the frame 60 to the wall panel 12. The ends 66 are received in recesses in the flange 22. The metal shielding hood 58 is then pulled up and positioned against the back of the frame 60, held thereto with a snap fitting of mating tabs 68, 70 formed in the shielding hood 58 and on inwardly bent flange 71 of the holder frame 60 respectively with the help of a temporarily mounted handle 57. Screws 69 (FIG. 3 ) are also installed to secure the shielding hood 58 to the frame 60.

The rear of the main housing piece 14 has a bulged extension 72 such as to accommodate the curving sides of the fire extinguisher 21 and the metal shielding hood 58 likewise has an outward bulging portion 74 in correspondence thereto.

Opening 78 (FIG. 5) is provided through the bottom of the metal shielding hood 58 in order to extend wires 80 from the battery 50 to the circuit board 52 as indicated. Opening 76 (FIG. 5) is provided in the bottom wall of the shielding hood 58 to extend wires 77 from the battery storage-junction box 88 (where household electrical supply wires are connected to wires 27) to the circuit board 52, the wires 77 routed around the outside of the main housing piece 12. An opening 79 is also provided in the upper sidewall of the battery storage-junction box 88 through which the wiring leads from the household power supply for connection to the circuit board 52. A grounding shunt cable 82 is also provided.

A hanger 86 holds the battery storage-junction box 88 suspending the same beneath the main housing piece 14 and shielding hood 58.

Figure 7:
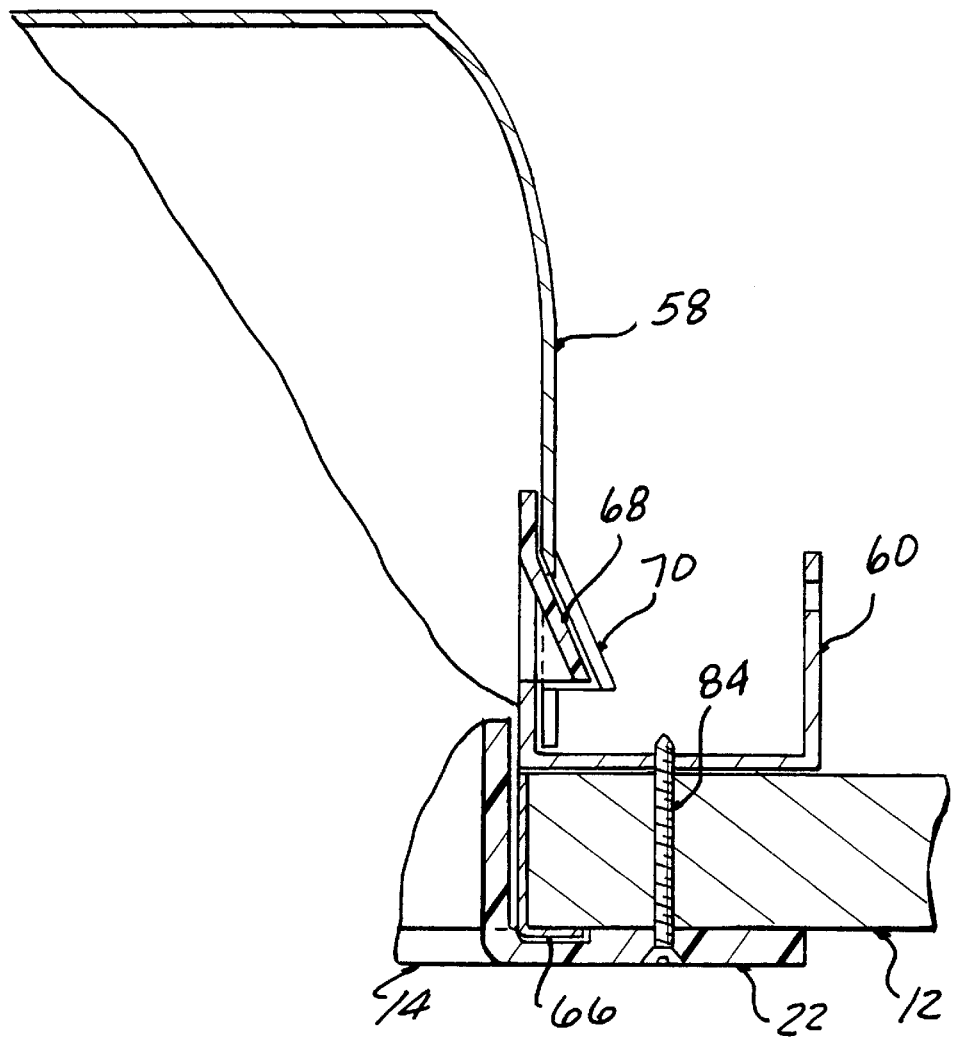
FIG. 7 is an enlarged sectional plan view taken through a section of the cabinet at the forward portion thereof illustrating the connection between the shielding hood and the mounting frame, and also of the cabinet to the wall panel.

Referring to FIG. 7, the complete assembly details are shown in which the main housing piece 14, shielding hood 58 and frame 60 are shown secured together. The side parts of the flange 22 receive threaded fasteners 84 which also pass through the wall panel 12 and engage sides of the mounting frame 60.

Figure 8:
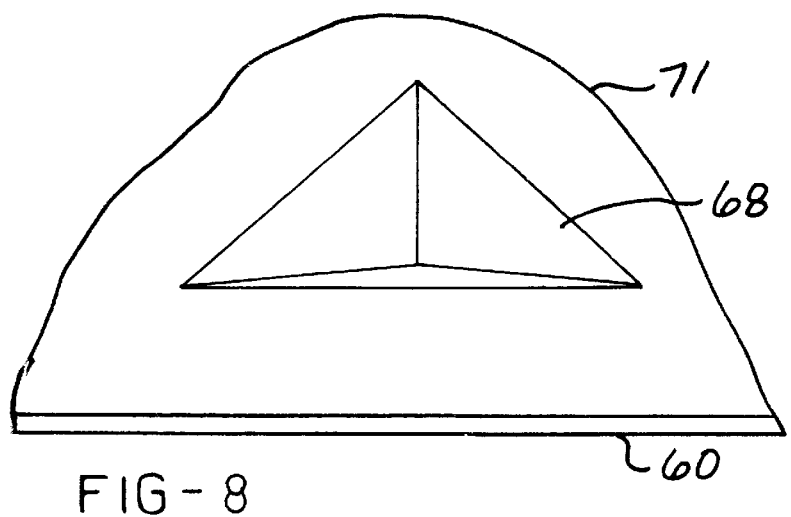
FIG. 8 is a side view of the shielding hood illustrating the snap fitting feature adapted to mate with the corresponding feature on the mounting frame.

The interfitting of the features 68, 70 is shown in FIGS. 7 and 8.

The main housing piece 14 is screwed to the hood 58 by means of a series of screws 83 through the backwall of the main enclosure piece 14 passing into the sheet metal shielding hood 58.

For new construction, tabs 89 may be used to secure the frame 60 to wall framing members.

Figure 9:
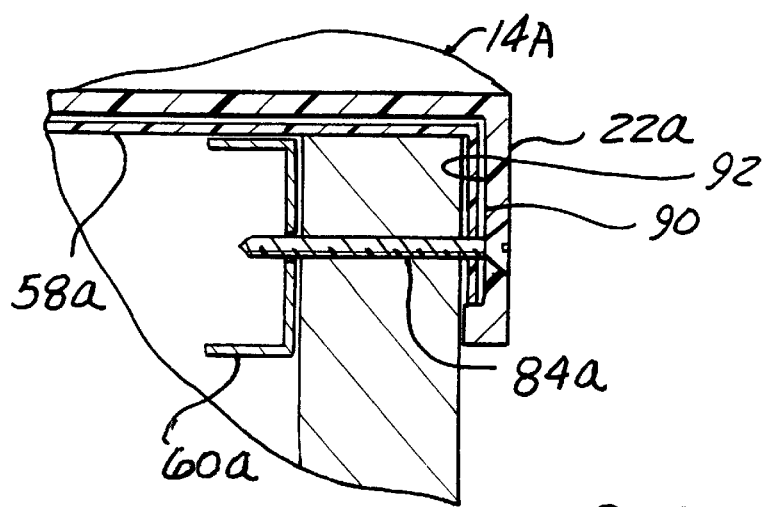
FIG. 9 is an enlarged partially sectional view taken through the side portion of the cabinet according to the present invention illustrating an alternate mounting arrangement for securement to the wall panel and the various components of the cabinet.

An alternate mounting arrangement is shown in FIG. 9 in which the hood 58A has an outer flange 90 received in a recess 92 of the flange 22A of the main enclosure piece 14A. The screws 84A pass as before to be received into the metal mounting frame 60A eliminating the need for the snap fitting feature 68 and 70.

Figure 10A:
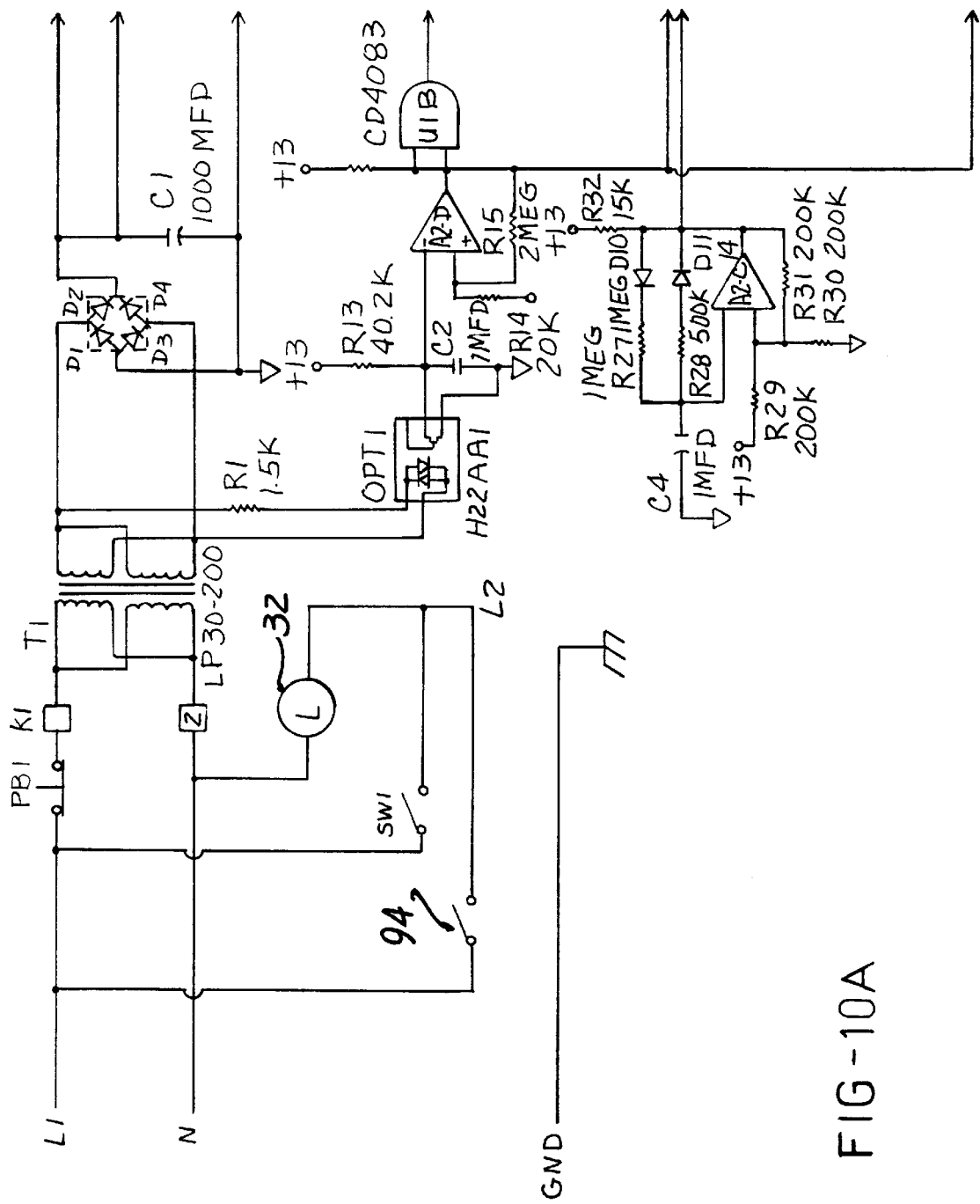
FIGS. 10A and 10B are electrical schematic diagrams illustrating the circuitry utilized for the lighting system incorporated in the cabinet according to the present invention.
Figure 10B:
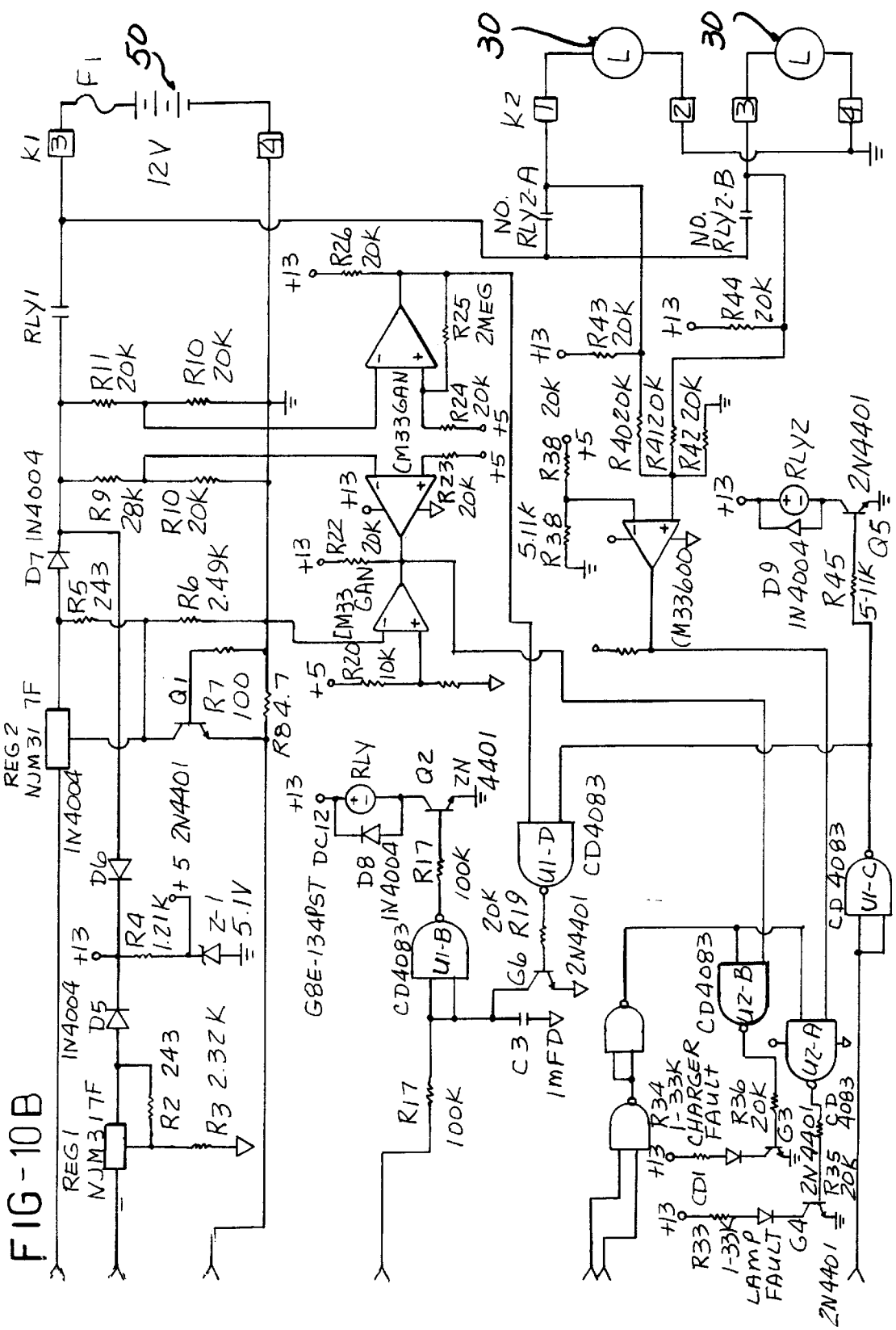

Referring to FIG. 10A and 10B, line voltage of 115 VAC from the house wiring is applied to the circuit board through normally closed push button PB1 (36) to transformer T1. By operation of push button PBT, a manual check of the emergency lighting can be done.

Line voltage is also connected through SW1 or from an optional wall switch 94 to a 115 VAC lamp 32. Closure of either switch will turn on the auxiliary night light lamp 32.

The 115 VAC applied to the circuit board 52 is stepped down and converted to a nominal 30 VDC with diodes D1, D2, D3, D4 and filter capacitor C1. The 30 VDC is applied to regular circuit comprised of REG1, R2, R3, and D5 to produce a +13 supplied voltage for the electronic circuitry.

The 30 VDC is also applied to a second regulator circuit comprised of REG2, R5, R6, and R7 to produce a +13.6 volt charging voltage for the battery. The circuit of Q1, R7, and R8 limit the charging current to 0.22 amps.

The secondary AC voltage of transformer T1 is also applied to opto-coupler OPT1. When line voltage is present the transistor in OPT1 will turn ON and keep capacitor C2 discharged. When the line voltage is removed, capacitor C2 charges through resistor R13 and changes the state of comparator A2-D.

The output state of comparator A2-D when line voltage is present is HI. The output of NAND gate U1-A is therefore LO and the output of NAND gate U1-B is HI, turning on transistor Q1 and energizing relay RLY1. The charger current is now allowed to flow through the now closed contact of RLY1 to the battery 50.

When line voltage is removed and capacitor C2 is allowed to charge, the output state of comparator A2-D changes to a LO. This in turn forces the output of NAND gate U1-C to a HI and thus turning on transistor Q5. When Q5 turns on, relay RLY2 is energized closing contacts RLY2-A and RLY2-B and supplies power from the 12 volt battery 50 to the two lamps 30, LAMP1 and LAMP2.

At the same time RLY2 is energized by U1-C, the HI state of U1-C is applied to one of the inputs of NAND gate U1-D. The other input of A1-D to NAND gate U1-D is controlled by the state of comparator A1-D. The output of A1-D is LO until the battery voltage drops below 10 volts. The output of NAND gate U1-D is therefore HI while the battery 50 is above 10 volts and in turn keeps transistor Q6 on to keep capacitor C3 discharged. By keeping Q6 enabled capacitor C3 cannot charge, even though U1-A changed to a HI state when AC power was removed. When the battery voltage discharges to 10 volts, comparator A1-D will toggle and turn Q6 off. The capacitor C3 will charge and change the state of U1-B and turn transistor Q2 off. Relay RLY1 will then de-energize and open the contact of RLY1 and remove battery voltage that was applied to diode D6 for the circuit power supply during the time that REG 1 power was lost.

Whenever AC power is restored, the action of comparator A2-D will cause the battery 50 to resume charging.

Comparator A2-C is configured as an oscillator to provide a pulsating signal for the two LED lamps 34, 36, used for self diagnostics.

When line power is present and the two load lamps are off, the pull-up resistors R43 and R44 are held LO by the low impedance of the LAMP element. If the filament of either of the emergency lamps 30 were to open, then one of the pull-up resistors R43 or R44 would go HI. Comparator A2-A would detect this fault condition and its output would go HI. This will force the output of U2-A to change from a constant HI to a pulsating level. Therefore, the LED fault lamp LD2 (34) would change from constant on to blinking and warn of a faulty emergency lamp 30.

Comparators A1-B and A1-A monitor the charger current and battery voltage, respectively. The output of the two comparators will toggle HI of charger current is too low when the battery 50 is at a low level, indicating a problem in the charger circuit. This fault condition will change the LED lamp LD1 (36) from a constant "ON" to a blinking lamp indicating a fault in the charger system.

It will be noted that the emergency lights are separately wired to minimize the possibility that a failure of one lamp 30 will result in the failure of both lamps 30.

The fire extinguisher cabinet combines emergency lighting with a handsome enclosure for the fire extinguisher which is suitable for residential use.

I claim:

1. A combination of an emergency light and a fire extinguisher cabinet for an installation recessed into a wall of a building, comprising:

an enclosure defined by a cavity in a main housing piece of said cabinet, and bracket means configured to receive an upright fire extinguisher disposed in said enclosure;

a door hinged to said main housing piece to overlie an open side thereof when closed, said main housing piece recessed into a wall with said open side substantially flush with the outer surface of said wall;

a night light lamp base mounted in said cabinet and a night lamp installed therein and manual switch means for selectively electrically energizing said night light base with a building power supply, said lamp in said night light base also effectively illuminating the vicinity of said cabinet when energized;

at least one emergency lamp base mounted to said cabinet and an emergency lamp installed therein for illuminating the vicinity of said cabinet when energized, said emergency lamp and lamp base separate from said night light lamp and lamp base; and, emergency power supply means activated upon a failure of a power supply to said cabinet to energize said emergency lamp in said emergency lamp base.

2. The combination according to claim 1 wherein said emergency power supply includes a battery and circuit means for electrically connecting said emergency lamp base to said battery upon a failure of a power supply to said circuit means.

3. The combination according to claim 2 wherein said battery is rechargeable and said circuit means includes means for electrically connecting said battery to said power supply so as to be able to charge said battery whenever said power supply is uninterrupted.

4. The combination according to claim 3 wherein said circuit means includes an indicator activated whenever a fault in said lamp is detected.

5. The combination according to claim 3 wherein said circuit means includes an indicator activated whenever a fault is detected in said battery charging circuit.

6. The combination according to claim 1 wherein said switch means comprises a wall-mounted switch.

7. The combination according to claim 1 wherein said manual comprises a pushbutton switch in said cabinet.

8. The combination according to claim 1 further including a second separately wired emergency lamp holder and lamp also energized by said emergency power supply means.

9. The combination according to claim 1 wherein a light reflector piece is mounted atop said main housing piece above said door and enclosing in part said emergency lamp base and lamp installed therein, and a transparent cover piece with a translucent center area overlying said reflector piece.

10. The combination according to claim 1 wherein said door includes a viewing panel allowing observation of a fire extinguisher disposed in said cavity of said main housing piece.

11. The combination according to claim 1 further including a sheet metal shielding hood enclosing a recessed back portion of said main housing piece.

12. A combination of an emergency light and a fire extinguisher cabinet for an installation recessed into a wall, comprising:

an enclosure defined by a box-like cavity formed by a portion of a molded plastic main housing piece of said cabinet, and bracket means configured to receive an upright fire extinguisher disposed in said enclosure;

a door hinged to said main housing piece to overlie an open side thereof when closed, said main housing piece recessed into a wall with said open side substantially flush with the outer surface of said wall;

a sheet metal shielding hood receiving and enclosing said portion of said main housing piece defining said box like cavity;

at least one lamp base mounted to said cabinet and an emergency lamp in said lamp base for illuminating the vicinity of said cabinet when energized; and, emergency power supply means activated upon a failure of a power supply to said cabinet to energize an emergency lamp in said lamp base.

13. The combination according to claim 12 wherein said main housing piece and door are molded of one piece with integral hinges.

14. The combination according to claim 12 wherein said main housing piece includes a flange extending about the exterior of an opening in said wall into which said piece is recessed, and in abutment thereagainst.

15. The combination according to claim 14 wherein said cabinet further includes an open mounting frame configured to fit around an inside surface of a wall panel in which said wall opening is defined, and further including fasteners connecting said flange of said main housing piece to said mounting frame.

16. The combination according to claim 15 wherein a series of pointed bendable tabs project out from said mounting frame enabling anchoring to said wall panel during installation by being tapped into said wall panel to be held in place as a template, and thereafter able to have ends thereof bent around an edge of said wall panel adjacent an opening cut thereinto.

17. The combination according to claim 16 wherein said main housing piece flange has recesses to accommodate said bent tab ends.

18. The combination according to claim 15 wherein said mounting frame comprises a channel-shaped section extending in a rectangular open frame.

19. The combination according to claim 15 wherein said sheet metal shielding hood is secured to said mounting frame.

20. The combination according to claim 19 wherein said mounting frame and shielding hood have snap fit features interengaged with each other.

21. The combination according to claim 20 wherein said shielding hood and said main housing piece are connected together with screw fasteners.

22. A combination of an emergency light and a fire extinguisher cabinet for an installation recessed into a wall, comprising:

an enclosure defined by a cavity in a main housing piece of said cabinet, and bracket means configured to receive an upright fire extinguisher disposed in said enclosure;

a door hinged to said main housing piece to overlie an open side thereof when closed, said main housing piece recessed into a wall with said open side substantially flush with the outer surface of said wall;

at least one lamp base mounted to said cabinet and having an emergency lamp installed therein lot illuminating the vicinity of said cabinet when lit; and, emergency power supply means activated upon a failure of a power supply to said cabinet to energize an emergency lamp in said lamp base, said emergency power supply including a battery and circuit means for electrically connecting said lamp base to said battery upon a failure of a power supply to said circuit means, said battery disposed within a battery storage box hung within said wall and supported by said enclosure.

23. The combination according to claim 22 wherein said battery storage box has openings to allow wiring to be passed thereinto to allow use as a junction box for wiring to said circuit means.

* * * * *